Nov. 4, 1952 U. F. KLECKNER 2,616,289
APPARATUS FOR DYNAMICALLY BALANCING ROTATING ELEMENTS
Filed Nov. 27, 1946
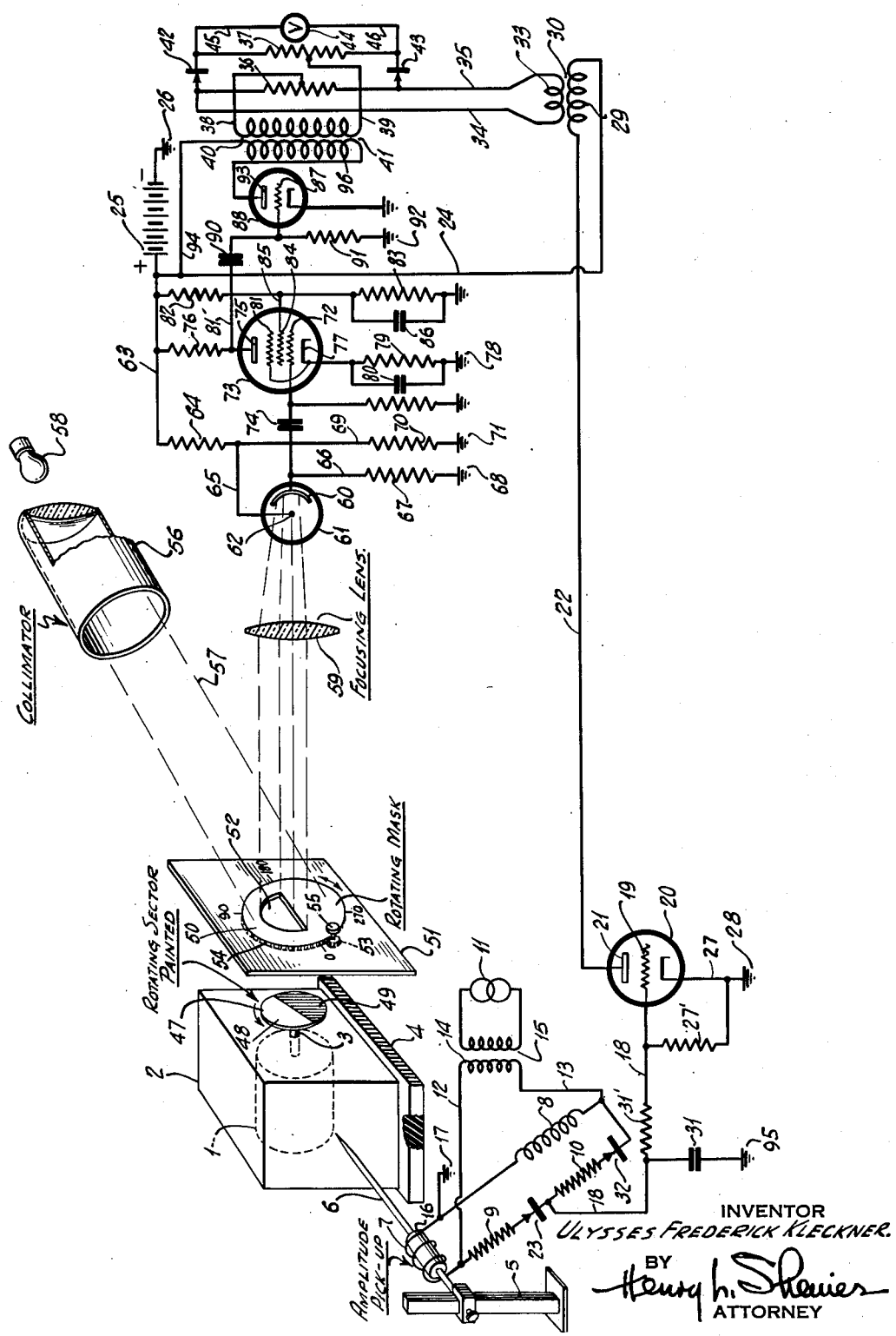
INVENTOR
ULYSSES FREDERICK KLECKNER.
BY
Henry L. Shenier
ATTORNEY Patented Nov. 4, 1952

2,616,289

UNITED STATES PATENT OFFICE 2,616,289

APPARATUS FOR DYNAMICALLY BALANCING ROTATING ELEMENTS

Ulysses F. Kleckner, New York, N. Y., assignor to The Norden Laboratories Corporation, New York, N. Y., a corporation of Connecticut Application November 27, 1946, Serial No. 712,492

5 Claims. (Cl. 73—66)

My invention relates to an improved method and apparatus for dynamically balancing rotating elements such as gyroscopes, turbine rotors, motor armatures, vehicle wheels, grinding wheels and the like.

The solution to the problem of dynamically balancing rotary masses comprises ascertaining the mass of unbalance and the direction of the radius along which this mass lies and its length. Balance can then be achieved by positioning an equal mass on the opposite radius. The mass of unbalance is a function of the amplitude of vibration of the rotating mass. This may be easily ascertained from the vibration of the housing in which the rotating mass is located or otherwise, by means of an amplitude detecting device such as a crystal pick-up, a magnetic pick-up, a capacitive pick-up, a wire strain gauge or the like. A phasing device such as a commutator and movable brush may be attached to the axis of the rotating mass and the angular position of the radius of unbalance can be determined. A mechanical coupling device such as a commutator, however, may introduce errors, especially in masses rotating at a high speed and where the drive is of low torque. In such cases the vibrations make mechanical coupling difficult. Then, too, mechanical coupling may introduce an overload, especially with low torque equipment. Furthermore, mechanical coupling requires close machining of parts and is expensive.

One object of my invention is to provide a new and improved method and means for dynamically balancing rotating masses.

Another object of my invention is to provide a means and method of determining the angular position of the radius of unbalance in a manner which will not introduce friction and which is not affected by the vibrations of the unbalanced rotating mass.

Another object of my invention is to provide an improved apparatus for dynamically balancing rotating masses which is easy to operate, simple and inexpensive to construct.

Other and further objects of my invention will appear from the following disclosure.

The accompanying drawing, which forms part of the instant specification and which is to be read in conjunction therewith, is a diagrammatic view showing one form of apparatus embodying the apparatus of my invention and capable of carrying out the method of my invention.

In general my invention contemplates the mounting of the housing containing the rotating mass which is to be balanced in a flexible manner so that the housing is free to vibrate under the influence of the unbalanced rotor. The vibrations in a direction at right angles to the axis of rotation are detected by means of a magnetic, a crystal, a capacitive or a resistance pick-up capable of producing voltage which varies as a function of the ampliude of vibrations of the rotating mass and hence as a function of the mass of unbalance. Photoelectric means are employed to determine the angular position of the radius along which the center of gravity of unbalance lies. Knowledge of the mass and radius of unbalance and the angular position of the radius enables the rotating mass to be brought into dynamic balance.

More particularly, referring now to the drawing, a rotating mass 1 is mounted for rotation within a casing or housing 2, for rotation about shaft 3. The housing 2 is mounted on a flexible support 4 made of any suitable flexible material such as rubber or of any suitable design which permits the housing 2 to vibrate freely under the influence of the unbalanced rotor 1 and allows the rotor to spin about its principal axis of inertia. Mounted upon any suitable support 5 is a feeler 6 adapted to contact the housing 2. The feeler 6 is adapted to transmit vibrations from the housing to the pick-up device. I have shown for purposes of illustration only and not by way of limitation a magnetic pick-up which is connected to a bridge having a pair of coils 7 and 8 and a pair of resistors 9 and 10, the coil 7 comprising part of the pick-up. An alternating potential from any suitable source 11 is impressed across the bridge through conductors 12 and 13 leading from the secondary coil 14 of a transformer 15. A soft iron core 16 is positioned within the coil 7. The inductance of the coil 7 varies as a function of the position of the core 16. One of the other terminals of the bridge is grounded at 17, while the corresponding opposite terminal is connected by conductor 18 to the grid 19 of thermionic tube 20. The anode 21 of the tube 20 is connected by conductor 22, primary winding 29, and conductor 24 to the positive terminal of a battery 25. The negative terminal of the battery 25 is grounded at ground 26. The cathode 27 of the tube 20 is grounded at 28. A rectifier 23 is placed in the branch of the bridge containing resistor 9. A second rectifier 32 is in series with resistor 10 in the other resistive branch of the bridge. Both rectifiers are positioned in a direction to rectify the output of the bridge. The frequency of the A.-C. supply 11 is higher than the highest frequency of vibration to be encountered. The capacitor 31 and the resistor 31' form a high-pass filter which offers a low impedance to the frequency of the exciting current permitting it to pass to ground 95. The resistor 27' prevents the grid 19 from floating. The secondary winding 33 of the transformer 30 is connected by conductors 34 and 35 across the resistor 36 of a phase detecting network. An intermediate point of resistor 36 is connected to an intermediate point of a resistor 37 through conductors 38, 39 and the secondary winding 40 of a transformer 41. The ends of resistors 36 and 37 are connected by rectifiers 42 and 43. A voltmeter 44 is connected across the resistor 37 by means of conductors 45 and 46.

In the bridge associated with the pick-up, capacitors may be used instead of inductors. Similarly, resistors may be used. The variable resistor may be a wire strain gauge. It will be observed in my pick-up that the voltage output will remain proportional to the amplitude of vibration alone irrespective of the frequency of vibrations. This is highly important.

Attached to the shaft 3 of the rotating member, I provide a balanced disk 47 having a light reflecting sector 48 and a light absorbing sector 49. The light reflecting sector may be a mirror, aluminum paint, white paint or the like. The light absorbing sector may be painted with optical black. Adjacent the sector and aligned therewith I provide a rotatable mask 50 mounted in any suitable support 51. The mask is provided with an aperture 52 generally of the same shape as the light reflecting sector of the rotating disk. Any suitable means for rotating the mask 50 may be provided such as pinion 53 which engages gear teeth 54, formed on or attached to the rotating mask 50. The pinion is rotatable by hand through knob 55. Support 51 may be suitably calibrated. The rotating disk 47 is secured to the shaft 3 in known relation to the rotor 1. A collimator 56 is adapted to form a beam 57 of light from any suitable light source such as incandescent lamp 58, to illuminate the mask uniformly over the approximate diameter of the reflecting disk. The beam of light is adapted to be reflected by the reflecting sector 48 through the mask 52 and is focused by lens 59 upon the cathode 60 of a photoelectric tube 61.

While I have shown a source of light in front of the rotating mask, it is to be understood that a light source may be placed behind the rotating mask. In this case it is unnecessary to use a collimator. Likewise, if the construction of the rotating mass permits, a light source may be placed behind the rotating disk 47 and opaque and transparent sectors may be employed. The mask 50 may be placed anywhere in the collimated beam or if desired in any focal plane along the optical axis in front of the photocell 61. The anode 62 of the photoelectric tube 61 is supplied with positive potential from battery 25 through conductor 63, resistor 64, and conductor 65. The cathode 60 is connected to ground 68 through conductor 66 and resistor 67. Resistor 70 connects conductor 69 to ground 71. Resistors 70 and 64 form a voltage divider which supplies positive potential through conductor 65 to the anode 62 of the photoelectric tube 61. The resistor 67 is analogous to a cathode follower, the output being taken between cathode 60 and ground 68 across the resistor 67. The output of the photoelectric tube 61 is connected to the grid 72 of the thermionic tube 73 by means of capacitor 74. The anode 75 of the tube 73 is supplied with potential from the battery 25 through conductor 63 and resistor 76. The cathode 77 of the tube 73 is connected to ground 78 through a self-biasing resistor 79. A by-pass capacitor 80 is provided across the resistor 79. The grid 81 of the tube 73 is connected to the cathode 77 and is at cathode potential. Resistor 82 and resistor 83 form a voltage divider to which suppressor grid 84 is connected by means of conductor 85. Resistor 83 is provided with a by-pass capacitor 86. The output of thermionic tube 73, which is a pre-amplifying tube, is impressed upon the grid 87 of the thermionic tube 88 through conductor 87' and capacitor 90, the plate circuit of tube 73 being completed through resistor 91 and ground 92. The anode 93 of the tube 88 is supplied with positive potential from battery 25 through conductor 94 and through primary winding 96 of the transformer 41 so as to impress the output of the amplifier tube 88 across the primary winding 96. The secondary winding 40 of the transformer 41 is connected to the resistors 37 and 36 of the phase detecting network in push-push relation. It will be observed that the output of the amplitude signal is impressed into the network in push-pull relation.

When the upper end of secondary winding 40 is at positive potential, current will flow through conductor 38 to the midpoint of resistor 36 through the upper branch of resistor 36 through rectifier 42 through the upper branch of resistor 37 to the other end of the secondary winding 40. At the same time current will flow through the lower branch of resistor 36 through rectifier 43 through the lower branch of resistor 37 and thence to the other end of the secondary winding 40. When the lower portion of secondary winding 40 is positive, rectifiers 42 and 43 will prevent the flow of any current so that the effect of the network is to produce a phasing signal which comprises a series of positive pulses.

The amplitude signal is impressed across the resistor 36 in push-pull relation, that is to say, when the upper end of resistor 36 is positive, its lower end will be negative and vice versa. Let us now consider that the upper end of resistor 36 is positive. Current will flow through rectifier 42 through the upper portion of resistor 37 through conductor 39 through winding 40 and thence to the midpoint of resistor 36.

When the lower end of resistor 36 is positive, current will flow through rectifier 43 through the lower portion of resistor 37 through conductor 39 through the secondary winding 40 to the midpoint of resistor 36. It will be observed that either the upper portion or the lower portion of resistor 37 will carry current, depending on the phase of the amplitude signal.

The integrating of the series of positive pulses produced by the phasing signal with the amplitude signal produces a voltage drop across the resistor 37 which is measured by the voltmeter 44. The phasing signal is of higher voltage than the amplitude signal, and the current through voltmeter 44 will be proportional to the product of the amplitude signal voltage and the cosine of the phase angle between the two signals.

The variable impedance 7 will vary as a function of the vibrations with respect to the fixed impedance 8, and the signal across the conductor 18 and ground 17 will appear as a series of pulses within a sine wave envelope. The pulses appear at the carrier frequency. The shape of the envelope is determined by the modulation, that is, the variation of the output of the bridge caused by the variation of the impedance 7. With the use of the capacitor 31, the resulting signal applied to the grid 19 of the tube 20 will have the shape of the envelope, the pulses being by-passed to ground by the capacitor 31, this capacitor and the resistor 31' forming a high-pass filter which offers a low impedance to the frequency of the exciting current.

If the impedance 7 is always greater than or always less than the impedance 8, then the rectified voltage output of the bridge between ground 17 and conductor 18 would appear as a series of pulses on one side or the other of zero potential depending on whether impedance 7 is greater or less than impedance 8. The pulses would be within an envelope whose shape is determined by the variation of impedance 7. With the high-pass filter, however, the pulses are passed to ground and only the shape of the envelope, that is, a varying signal of a predetermined polarity, appears upon the grid 19.

Since the phase angle of the current through arms 7 and 8, that is, between the fixed impedance and the variable impedance, is substantially entirely dependent upon the carrier frequency and is determined with respect to this frequency, it will be clear that the modulation frequency will have no effect on the phase angle with respect to the modulation wave.

The output voltage of the bridge is the difference of voltage between the conductor 18 and ground 17. The voltage at the conductor 18 and ground 17 with respect to the carrier voltage is determined by the ratio of the impedances and resistances, respectively, without regard to the actual magnitudes of the impedances and resistances. Accordingly, it will be clear that the output voltage of the bridge is not affected either by the modulating frequency or by the carrier frequency.

If the two impedances 7 and 8, that is, the variable impedance and the fixed impedance, are varied oppositely, the impedance of the whole bridge is constant and any errors due to changing current will be eliminated. The impedance from conductor 18 to ground through the network 31, 31' and 27' of the grid 19, is very high compared to the impedance of the bridge, so that very little current is drawn. Thus, I am enabled to maintain the voltage difference across the output of the bridge. The small drain of current does not affect the results since in any case voltage can never be measured without a small loss of energy incident to the taking of the measurement.

In operation, the mask is rotated to produce the greatest deflection of the voltmeter needle. At this point the position of the rotating mask will indicate the angular position of the radius of unbalance. The voltmeter may be calibrated to indicate units of mass at a given radius to achieve balance and the angular position of mask 50 will indicate the angular position of the radius. The amplitude of vibration is a function of the mass of unbalance, its radius, and the speed of rotation. The speed of rotation being constant, we may assume a radius along which to place balancing weights and calibrate the voltmeter in units of mass along this radius. Due to the mounting employed which permits the rotor to spin about its principal axis of inertia, the amplitude of vibration will be proportional to the amount of unbalance alone. Since I employ a vibration pickup which measures displacement alone independently of speed of rotation, the calibration of the voltmeter will be correct for all speeds at which the rotor is spinning about its principal axis of inertia.

It will be seen that I have accomplished the objects of my invention. I have provided a novel means for dynamically balancing rotary masses which is simple, efficient, accurate and easy to operate. By means of my photoelectric apparatus I ascertain the angular position of the radius of unbalance so that corrections may be quickly, simply and expeditiously made. My voltmeter may be calibrated in units of mass to be applied along a radius 180° from the direction of radius of unbalance or if desired the mask itself may be calibrated to give the proper direction of the radius to which the balancing mass is to be applied. The objections to mechanical coupling are avoided. There is no danger that the photoelectric coupling may introduce vibrations or overloads in the case of low torque, high speed equipment.

In the attempts of the prior art to solve the problem, a pickup, which is responsive to both the speed of vibration and its amplitude has been attempted to be used. These attempts fall short of solving the problem for several reasons. The speed of vibration is a function of the speed of rotation and an apparently different mass of unbalance is registered at every different speed of rotation. Many types of machinery do not move at constant speed and with these errors will be introduced. It will be observed in my method and apparatus that the signal generated by the mass of unbalance is independent of the speed of rotation and is a true function of the displacement caused by the vibration.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is therefore understood that my invention is not to be limited to the specific details shown and described.

Having thus described my invention, I claim:

1. An apparatus for dynamically balancing a rotating part having a casing including in combination means for flexibly mounting said casing, a source of alternating potential, circuit means connected to said source including means for modulating said alternating potential to produce a signal as a function of the amplitude of vibrations caused by the unbalance of said rotating part independent of the frequency of vibration, photoelectric means for generating a signal which is a function of the angular position of said rotating element, means for varying the phase of said position signal, an impedance, means for impressing said amplitude signal across said impedance in push-pull relation, means for impressing said position signal across said impedance in push-push relation, said impedance being part of a phase detecting network, and means for indicating the output signal of said phase detecting network.

2. An apparatus for dynamically balancing a rotating element including in combination a source of alternating potential, circuit means connected to said source including means for modulating said alternating potential to produce a signal as a function of the amplitude of vibrations caused by the unbalance of said rotating element independent of the frequency of vibration, photoelectric means for generating a signal which is a function of the angular position of said rotating element, means for varying the phase of said position signal, a network comprising a pair of resistors, a pair of rectifiers connecting said resistors in parallel, a conducting path interconnecting intermediate points of said resistors, means for impressing said position signal on said path connecting said intermediate points, means for impressing said amplitude signal across one of said resistors, and indicating means responsive to the voltage drop across the other of said resistors.

3. An apparatus as in claim 2, in which said photoelectric generating means includes a light reflecting sector, means for mounting said sector upon said rotating element, and means for illuminating said sector.

4. An apparatus as in claim 2, in which said means for changing the phase of said position signal includes a mask formed with an aperture and means for rotatably mounting said mask.

5. An apparatus as in claim 2, in which said means for producing a signal which is a function of the amplitude of vibrations includes a Wheatstone bridge, said modulating means being a variable impedance in one of the arms of said bridge responsive to vibrations caused by the unbalance of said rotating element, and means for conducting the desired signal from the opposite terminals of said bridge.

ULYSSES F. KLECKNER.

REFERENCES CITED

The following references are of record in the file of this patent:

UNITED STATES PATENTS

| Number | Name | Date |
|---|---|---|
| 2,118,770 | Sivertsen | May 24, 1938 |
| 2,131,602 | Thearle | Sept. 27, 1938 |
| 2,197,967 | Dally | Apr. 23, 1940 |
| 2,394,411 | Tolman | Feb. 5, 1946 |
| 2,382,843 | Annis | Aug. 14, 1945 |
| 2,423,864 | Washburn et al. | July 15, 1947 |
| 2,426,305 | Hope | Aug. 26, 1947 |
| 2,429,216 | Ballman et al. | Oct. 21, 1947 |
| 2,461,645 | Kallmann | Feb. 15, 1949 |

FOREIGN PATENTS

| Number | Country | Date |
|---|---|---|
| 488,294 | Great Britain | July 15, 1938 |
| 730,790 | France | May 23, 1932 |

OTHER REFERENCES

Two publications entitled Brush Strokes by Brush Development Co., 3322 Perkins Ave., Cleveland, Ohio, (1) volume V, Nos. 1 and 2, Feb.-Mar. 1938, pp. 8 and 9; (2) volume IV, No. 11, Dec. 1937, pp. 3–6.